United States Patent [19]

Bynum

[11] Patent Number: 5,127,037
[45] Date of Patent: Jun. 30, 1992

[54] APPARATUS FOR FORMING A THREE-DIMENSIONAL REPRODUCTION OF AN OBJECT FROM LAMINATIONS

[76] Inventor: David K. Bynum, 1460 Rue de Trust, Erie, Colo. 80516

[21] Appl. No.: 567,719

[22] Filed: Aug. 15, 1990

[51] Int. Cl.$^5$ ............................................ G06F 15/46
[52] U.S. Cl. .......................................... 378/4; 378/95; 378/98; 378/162; 378/901; 364/474.24; 364/413.25; 364/425; 395/101
[58] Field of Search ................... 378/4, 901, 95, 98, 378/162; 364/425, 474.24, 413.25, 474.03, 413.19, 413.15, 413.14

[56] References Cited

U.S. PATENT DOCUMENTS

| | | | |
|---|---|---|---|
| 3,988,520 | 10/1976 | Riddle | 428/15 |
| 4,089,608 | 5/1978 | Hoadley | 356/156 |
| 4,132,575 | 1/1979 | Suzuki et al. | 156/58 |
| 4,385,360 | 5/1983 | Yamada et al. | 364/514 |
| 4,436,684 | 3/1984 | White | 378/4 |
| 4,469,930 | 9/1984 | Takahashi | 364/474.24 |
| 4,575,330 | 3/1986 | Hull | 425/174.4 |
| 4,575,805 | 3/1986 | Moermann et al. | 364/474 |
| 4,707,822 | 11/1987 | Hopkinson et al. | 378/901 |
| 4,751,643 | 6/1988 | Lorensen et al. | 378/901 |
| 4,752,352 | 6/1988 | Feygin | 156/630 |
| 4,821,200 | 4/1989 | Öberg | 364/474.24 |
| 4,835,688 | 5/1989 | Kimura et al. | 378/901 |
| 4,863,538 | 9/1989 | Deckard | 156/62.2 |
| 4,961,154 | 10/1990 | Pomerantz et al. | 364/522 |

FOREIGN PATENT DOCUMENTS 2197502  5/1988  United Kingdom .

OTHER PUBLICATIONS

Computer Graphics World, Mar. 1990 by Terry Wohlers, pp. 73-80.

*Primary Examiner*—Janice A. Howell
*Assistant Examiner*—Kim-Kwok Chu

[57] ABSTRACT

An object replicator that replicates the physical form of an object in a polymer or the like by employing a Computed Tomography scanner or a Magnetic Resonance Imaging system, to digitize the physical features of the object to be copied. This data is used to form an electronic three-dimensional representation of the object. The electronic representation is then sectioned and provided to a three-dimensional printer to replicate a copy of those features by sequentially forming and joining laminae corresponding to the sections, to build up a physical replication of the object in a step-wise fashion whereby the three dimensional object is auto-matically formed from a composite of laminae.

14 Claims, 2 Drawing Sheets

APPARATUS FOR FORMING A THREE-DIMENSIONAL REPRODUCTION OF AN OBJECT FROM LAMINATIONS

For a more complete description of the terminology used in the present application the reader is referred to my co-pending patent application 07/421,840, the contents of which are incorporated herein by reference.

BACKGROUND—FIELD OF INVENTION

This invention relates to methods and apparatuses for copying or duplicating the physical form of an object and more specifically a system that employs a Computed Tomography scanner (CT), or a Nuclear Magnetic Resonance system (NMR), also known as a Magnetic Resonance Imaging system (MRI), to digitize the physical features of an object and a three-dimensional printer to replicate a copy of those features in a medium such as a polymer.

BACKGROUND—DESCRIPTION OF PRIOR ART

Many devices are known in the art for automatic or semiautomatic production of a model of an object. One such device is disclosed in U.S. Pat. No. 4,821,200 issued 1989 to Öberg. The Öberg device copies an object such as the remaining stump of an amputated leg by using a laser video apparatus to measure the surface contour of the stump. This surface contour data is used to guide a model milling cutter to carve a model of the stump from a rotating workpiece. U.S. Pat. No. 4,575,805 issued 1986 to Moermann et al. shows a similar device that measures the surface contour of an object to be copied using a noncontact scan head and a light beam. The information then guides a milling machine to make a replica or model of the object.

All of the above listed devices are limited by the fact that they can reproduce only surface contour detail of the object to be reproduced. Reproduction of internal structure such as voids is not possible by these methods. Indeed these methods are unable to ascertain the internal structure as the sensory methods used scan only surface contours. In addition these methods are invasive and can not measure the surface contour of hidden objects such as human organs. Non-invasive methods are known for obtaining this information.

In many fields there has existed the need to replicate physical objects. UK Patent GB 2197502 A published May 18, 1988 to Faziollah Samangooie, discloses a model manufacturing apparatus that can copy a physical object by determining the x, y, z coordinates of points on the surface of the object to be copied after which these coordinates points are processed and used to guide a lath like cutting machine that carves a model of the object out of a block of carvable material.

Another object copying method is disclosed in U.S. Pat. No. 3,988,520 issued Oct. 26 to Riddle. This patent discloses a method of copying an object by the use of photography. As explained, a series of photographs is taken of the object to be copied at various angles about a common axis of rotation and by affixing the photographs to a carvable material, an outline of the object is created that serves as a guide in carving a replica of the object.

Both of the above mentioned methods for creating a replica of an object are capable of replicating only non-complex surface detail and can not reproduce internal detail at all. In addition the Riddle process is not automatic.

The present invention addresses these shortcomings by using the non-invasive methods of Computed Tomography and Magnetic Resonance Imaging to determine the hidden internal structure as well as surface detail of an object to be replicated.

Both emission and transmission Computed Tomography and Magnetic Resonance Imaging have provided methods of obtaining information regarding the internal structure of a subject, under study, without invasive procedures. This information is of such detail that three dimensional representations can be displayed on a CRT display enabling detailed examination of structure. These devices are also capable of discerning density, and in certain cases, the chemical make-up of the object under investigation. These imaging techniques have been used extensively in the medical field allowing medical practitioners to examine hidden internal structures such as brain tumors and to plan surgical procedures in advance of actual surgery. CT scanners have allowed physicians and mechanical engineers to predict the performance of artificial joints when coupled with a super computer such as an IBM 3090. These devices can factor in the unequal strengths of different region of bone allowing such devices to model a bone-implant interface. The goal of such modeling is to extend the lifetime of implants such as prosthetic hips. CT scanners have also been used outside the medical field to investigate hidden structure in other objects. An example of such uses is presented in U.S. Pat. No. 4,691,332 issued September 1987 to Burstein et al. This patent relates the use of computed tomography to image rather large dense objects such as rocket motors. The procedure produces images that are used to delineate small defects such as cracks, voids and separations in the rocket motor. The accuracy of this procedure is measured on a scale of 1,000's of an inch and is capable of locating defects anywhere within the motor. Also, metal castings, pipes, plates, and complex mechanical devices have also been imaged as detailed in U.S. Pat. No. 3,769,507 issued Oct. 30, 1973 to Kenny et al. Other patents related to the imaging of a variety of materials are U.S. Pat. No. 3,766,387 issued 1973 to Heffan, U.S. Pat. No. 3,894,234 issued 1975 to Mauch et al, and U.S. Pat. No. 3,008,049 to Cherry.

CT scanners use penetrating radiation such as X-rays or gamma rays to determine the physical characteristics of an object. In computed tomography a two dimensional image is generated from plural one dimensional projections. A source of penetrating radiation transmits radiation through an object to be examined and the attenuation of that radiation is monitored on the opposite side after passing through the object by one or more radiation detectors. When the source is moved relative to the object under study, radiation attenuation data is obtained from a number of directions. After which, a computed tomography reconstruction process is employed to generate an image of the subject's cross section. These cross sections then can be combined to create a very detailed three-dimensional representation of the object. The structure of enclosed objects such as internal organs, even though hidden from direct view, can be imaged.

The relatively new field of Magnetic Resonance Imaging, can also provide non-invasive examination of objects. In Magnetic Resonance Imaging an extremely powerful magnetic field, provided by the coils of a super-conducting magnetic, is imposed upon an object of study or a portion of that object, and the response of atoms making up the structure of the object is studied. By imposing a uniform magnetic field gradient, in the X, Y and Z axes and ascribing characteristics to the objects matter based upon the electro-magnetic measurements derived in response to the scanning magnetic field, the internal structure of the object is discerned.

Both of the above mentioned methods are capable of ascertaining the physical structure of an object and translating that information into a three dimensional electronic representation, of the object that is displayed on the two-dimensional screen of a CRT display. A noninvasive object replicating device is disclosed in U.S. Pat. No. 4,436,684 issued 1984 to White with Reexamination certificate issued in 1988. The White device uses a computed tomography scanner to measure an internal corporeal structure without invasive surgery. This data is then used to guide a lath-like sculpting tool to carve an object from a rotatable workpiece. Although the computed tomography scanner is capable of obtaining interior object detail as well as object surface detail the sculpting tool is only capable of rendering surface contour detail and unfortunately the interior detail is lost to the process. In addition the process would have difficulty rendering surface detail such as undercuts. Although the White method is a welcomed advance in the art, it falls short in the rendering of the intricate three-dimensional image information that is made available by the computed tomography scanner and other such devices. The present invention utilizes this extremely detailed three-dimensional image information to replicate a copy of the object using a process known in the art as three dimensional printing.

Three-dimensional printing systems have been developed that allow objects designed on a three-dimensional CAD system to be manufactured directly and automatically by these devices. The systems to which this invention refers by the term three-dimensional printer, are those devices that use computer programming to electronically section a three-dimensional design of a designed object, held in computer memory, into many thin electronic sections. These thin parallel planar sections are then sequentially manufactured and joined together to create the object as designed. Many methods have been proposed for manufacturing and joining these sections. A process termed stereolithography was disclosed in U.S. Pat. No. 4,575,330 issued Mar. 11, 1986 to Hull. Hull's process relies on a vat of liquid photocure polymer. This vat contains an elevator mechanism that is capable of submersion in the photocure polymer at discrete steps corresponding to the thickness of the aforementioned computer generated electronic sections. The process begins with the elevator platform submerged below the surface of the liquid polymer at a depth equal to the thickness of one section. A modulated ultra-violet laser scans the surface of the photocure polymer projecting an image that corresponds to the first section as provided by the aforementioned computer. The laser cures the section to approximately a 50% cure. After which the elevator platform and the attached section, descend into the liquid polymer by a distance equal to one computer derived section. A layer of liquid polymer then flows over the first section. This second and each subsequent layer is scanned and cured by the aforementioned scanning ultra-violet laser. This process is continued until the object is formed. A post-cure process using high intensity, ultra-violet lights is used to affect the final cure.

Another three-dimensional printing process termed selective sintering is disclosed in U.S. Pat. No. 4,863,538 issued Sep. 5, 1989 to Deckard. Deckard's process replicates the aforementioned computer generated sections by sequentially depositing thin layers of a meltable resin powder. Each layer of powdered resin is sintered or fused in turn by a scanning laser that projects computer generated sections. The object is built up in a step-wise fashion.

Still several other methods of forming and joining the computer generated sections are disclosed in my co-pending U.S. patent application Ser. No. 07/421,840, filed Oct. 16, 1989, now U.S. Pat. No. 5,088,047. This application is incorporated herein by reference. The preferred embodiment disclosed in my above mentioned patent application uses electrostatic transfer of fusible powders to form an object from computer generated sectional information. This method to my knowledge is the only method capable of forming an object from several materials at once. Other three-dimensional printing systems based on the aforementioned process of electronically sectioning a three-dimensional image and forming and joining these sections in physical form to create the object have been discussed in the literature. The names of a few of these processes are Optical Fabrication Technology, Somos Solid Imaging System, Ballistic Particle Manufacturing and the Soldier system from Israel. Any of the above mentioned methods are suitable for use as the three-dimensional printing means used in the present invention.

SUMMARY OF THE INVENTION

The present invention utilizes the detailed digital imagery provided by a Computed Tomography (ct) scanner or by Magnetic Resonance Imaging to provide the highly detailed data needed to create a three-dimensional electronic representation of an object. The aforementioned three-dimensional representation is then electronically sectioned into thin parallel planar sections corresponding to slices of the object. These electronic sections are then sequentially out-put to a three-dimensional printer that replicates the object. The scale of the replication can be enlarged, diminished, or the same size as the original object.

Therefore it is an object of the present invention to provide a method and apparatus to replicate the physical form of an existing object.

It is an additional object to provide a method and apparatus capable of rendering the aforementioned copy in a scale that is either enlarged, diminished or the same size as the original object copied.

Another object of the invention is to provide a method and apparatus that is capable of rendering the aforementioned replication in a variety of materials.

Still another object is to provide a method of making models for engineering testing and evaluation such as destructive testing.

Another object is to make copies of biological features such as organs of the human anatomy for study and evaluation.

Still further objects and advantages will become apparent from a consideration of the ensuing description and drawings.

DRAWING FIGURES

DESCRIPTION OF THE PREFERRED EMBODIMENTS

Figure 1:
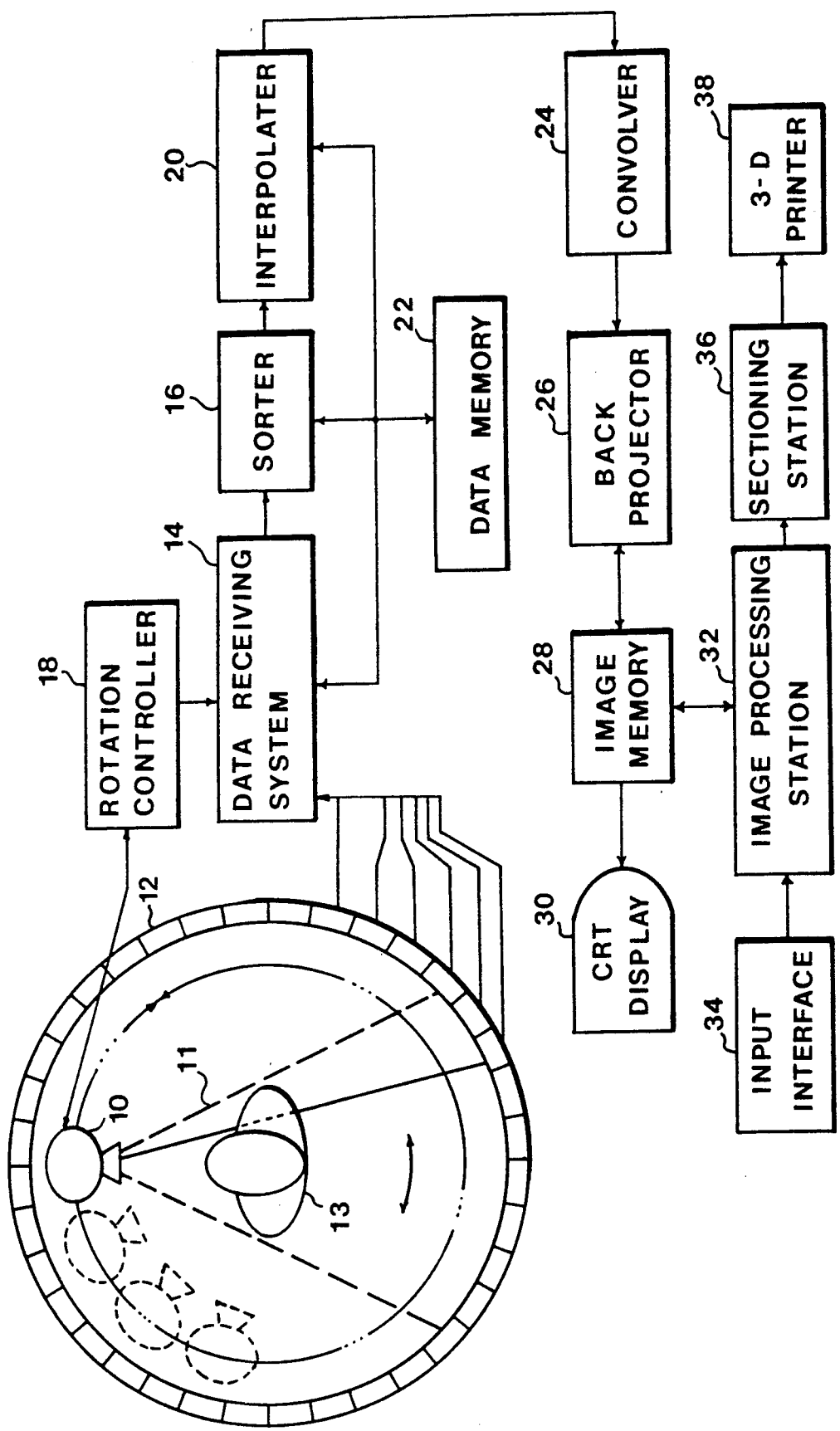
FIG. 1 is a block diagram schematically showing an arrangement of the preferred embodiment of the invention using a CT scanner as the data acquisition method.

The following is a detailed description of one of the preferred embodiments of the present invention. Refer now to FIG. 1 which is a block diagram that schematically shows the operation of the various elements of the invention using a CT scanner as the data acquisition device. In the following description, X-rays are used as the penetrating radiation, but other types of penetrating radiation may be used such as gamma radiation. Referring now to FIG. 1 where is shown a system that includes X-ray source 10, ring detector 12, data receiving system (DRS) 14, sorter 16, rotation controller 18, interpolator 20, data memory 22, convolver 24, back projector 26, image memory 28, cathode ray tube (CRT) display 30, image processing station 32, input interface 34, sectioning station 36, and three-dimensional printer 38. Source 10, constituted by an X-ray tube, is driven and controlled by controller 18. Source 10 may be similar to the source described in U.S. Pat. No. 4,002,917 in which a substantial point source of X-rays is scanned over an elongated anode by the scanning of an incident electron beam. The scanning X-ray beam is confined to a fan-shaped spread by a suitable collimator. This fan shaped plane of scanning X-rays is indicated by reference #11 in FIG. 1 and is directed toward the object 13. Source 10 rotates about object 13. Source 10 emits X-ray fan beam 11. Ring detector 12, concentric with the rotational center of source 10, is fixed outside the rotating path of source 10. Detector 12 is comprised of a large number of detector elements arranged to form a ring. Beam 11 transmitted through object 13, and is incident upon the detector elements of detector 12 which are opposite source 10 with object 13 interposed there between. X-rays incident on these detector elements are converted to an electrical signal that is proportional in magnitude to the X-ray intensity. This electrical signal is then supplied to DRS 14.

A cylindrical graticule (not shown) is fixedly disposed concentric with detector 12. The graticule has transparent and opaque portions alternately arranged at angular intervals on a circle. The number of transparent or opaque portions is twice the number of the detector elements in detector 12. The transparent or opaque portions of the graticule are detected by a photointerrupter (not shown) moved along the circle in synchronism with source 10. Light detected by the photointerrupter is converted to electrical pulses generated at a pitch half that of the array of the detector elements upon rotation of source 10. The detection system consisting of the graticule and photointerrupter is hereinafter referred to as a graticule sensor. Other types of graticule sensors may be used. A graticule can be rotated in synchronism with source 10, and a photointerrupter can be fixed together with detector 12 to constitute a graticule sensor. Furthermore, the graticule sensor may be constituted by a graticule with alternate reflecting and nonreflecting portions and a photosensor for detecting reflection/nonreflection of the graticule.

Electrical pulses from the graticule sensor are then supplied to controller 18. Controller 18 controls the rotation of source 10 in response to the pulses from the graticule sensor. These pulses are also supplied to DRS 14.

DRS 14 samples electrical signals from detector 12 and converts them from analog into digital signals in response to pulses generated by the graticule sensor. The pulses generated by the graticule sensor are responsive to the rotation of source 10. Each sampling of electrical signals from detector 12 by DRS 14 constitutes one projection corresponding to X-ray paths projected into the aforementioned fan-shape originating from source 10. Digital signals from DRS 14 are then supplied to sorter 16. For each sampling or projection, the projection data is supplied to sorter 16 and serves as source fan data corresponding to the fan-shaped X-ray paths which originated from source 10. Sorter 16 rearranges the source fan data obtained by successive projection operations to obtain first detector fan data corresponding to the fan-shaped X-ray paths obtained from each detector element. The first detector fan data from sorter 16 is supplied to interpolator 20. Interpolator 20 interpolates the first detector fan data corresponding to the X-ray paths passing the positions of source 10 and the detector elements and generates second detector fan data corresponding to predetermined X-ray paths at equal angular intervals as viewed from the respective detector elements. Memory 22 connected to DRS 14, sorter 16 and interpolator 20 helps the respective processing thereof. The second detector fan data from interpolator 20 is supplied to convolver 24. Convolver 24 performs convolution of the second detector fan data so as to prevent an image from being blurred upon back projection thereof, thereby obtaining third detector fan data. The third detector fan data from convolver 24 is supplied to back projector 26. Projector 26 projects the third detector fan data to memory 28 with a memory space corresponding to coordinates of a slice of object 13. Back projection by projector 26 is performed such that the third detector fan data is accumulated and written in correspondence with the X-ray path position. The third detector fan data is then accumulated in memory 28, thereby reconstructing image data representing a slice of object 13. The reconstructed image is then read out from memory 28 and displayed on display 30. Object 13 is moved, by a motive means not shown in FIG. 1, perpendicular to the plane described by detector 12 and rotation of source 10. So that a next adjacent slice of object 13 may be imaged. The aforementioned steps of rotating source 10 relative to detector 12, processing data out-put from detector 12, is repeated to form a second successive image slice of the object to be copied. This second slice is stored in image memory 28 with the first slice of object 13. The above listed processes of moving object 13 relative to detector 12 and source 10 is repeated a plurality of times to obtain plural adjacent image slice of object 13. Image data stored in memory 28 is delivered to image processing station 32 where image slices of object 13 are electronically joined by interpolating the data to create a smooth joining and transition between slices to form a three-dimensional electronic representation of object 13. Image processing station 32 is electronically connected to in-put interface 34. In-put interface 34 is a device such as a computer key board, track ball or mouse or a combination of these such devices allowing an operator to in-put instructions to processing station 32. These instructions change or modify the three-dimensional image held in memory 28. The operator of in-put interface 34 electronically processes the three-dimensional image held in memory 28 to remove extraneous material, to arrange the electronic image into the proper orientation for manufacture and to specify the scale of reproduction. CRT display 30 is located within view of operator of interface 34. Image displayed on CRT display 30 is continually updated during the aforementioned processing steps to continually display the progress of the image processing to the operator of interface 34. After modified three-dimensional image as held in memory 28, is finalized, it is supplied to a sectioning process indicated at 36. The three-dimensional image is then electronically sectioned at processing station 36 into plural parallel planar sections that transverse the image at intervals corresponding to the physical thickness of the physical reconstruction of the sections termed lamina in the art, later to be formed by a three-dimensional printer indicated by reference #38. Three-dimensional printer 38 sequentially receives electronically generated sections from sectioning station 36. These sections are manufactured as lamina and are bonded together to form a copy of object 10.

Figure 2:
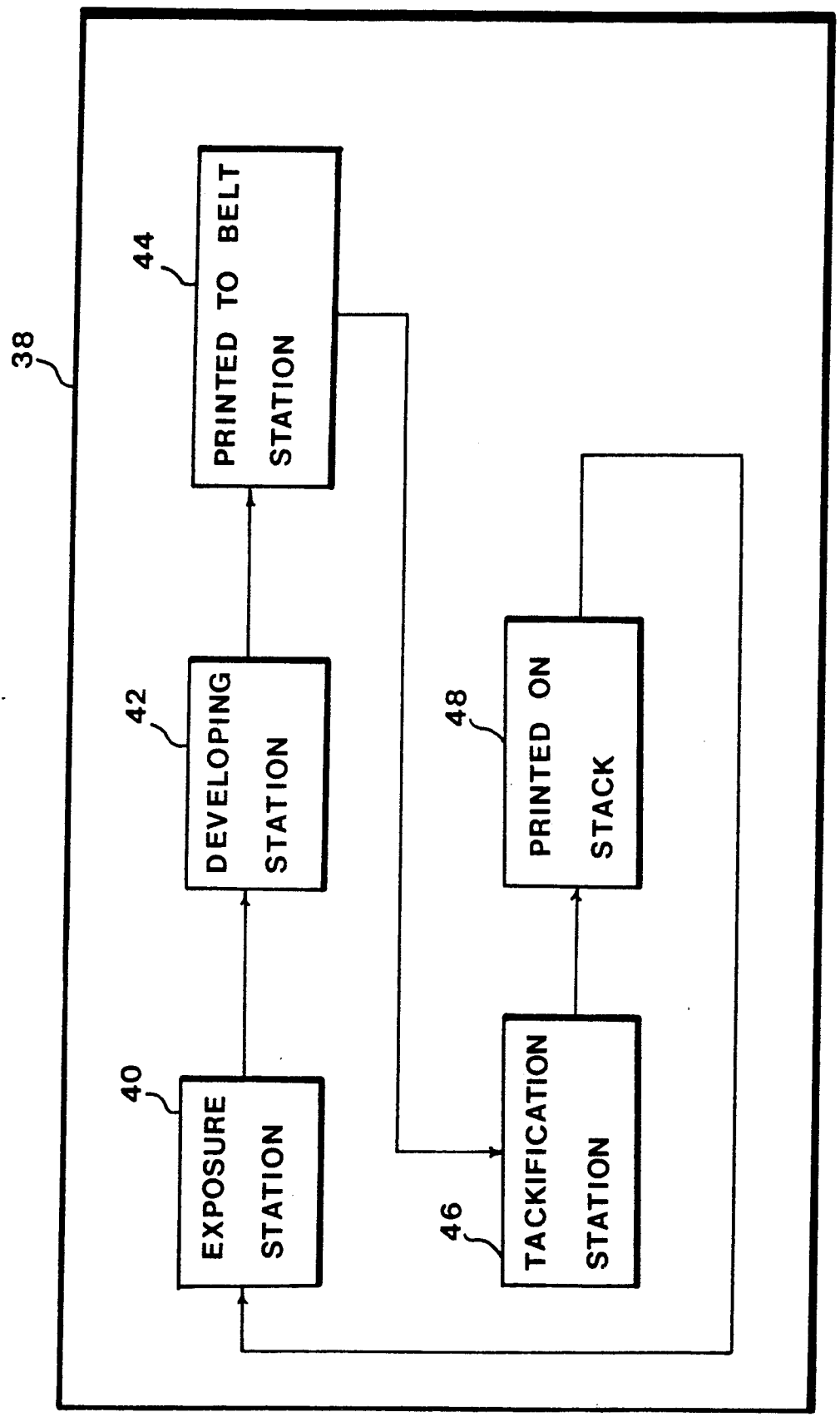
FIG. 2 is a block diagram schematically showing a three-dimensional printer.

Refer now to FIG. 2 where is shown the components of a typical three-dimensional printer which is the preferred embodiment of my co-pending patent application 07/421,840 and is shown therein in greater detail. As detailed in the preceding description of FIG. 1, electronic sections of a copied object are delivered to a three-dimensional printer indicated by Reference #38. This particular three-dimensional printer comprises a series of processing stations. The first of which is an exposure station indicated by Reference #40. A photoconductive drum containing a uniform two dimensional electrostatic charge is exposed to the modulated light of a scanning laser projecting an image of the first electronic section as supplied by sectioning station 36 as shown in FIG. 1 but not shown in FIG. 2. The projected light image projected by the aforementioned scanning laser selectively dissipates the electrostatic charge contained on the electrostatic drum thereby creating a latent image. The latent image is developed at developing station 42 by applying forming powders to the latent image contained on the photo-conductive drum. These forming powders are meltable resin powders that are transferred to the latent image contained on the photoconductive drum by electrostatic transfer. The powdered image contained on the photoconductive drum is transferred to a continuous belt by electrostatic transfer indicated in FIG. 2 by processing step 44. Continuous belt containing the forming powder image corresponding to the first section, hereafter referred to as lamina, advances to tackification station 46 where by solvent vapor or heat the aforementioned lamina is made tacky. The now tacky lamina advances to station 48 where the lamina is printed on a surface supported by an elevator mechanism. The elevator mechanism lowers the first lamina in preparation to receive a second and successive laminae. A second lamina is formed by the above listed steps 40 through 48. The second lamina corresponds to the second electronic section as generated by sectioning station 36 shown in FIG. 1 but not shown in FIG. 2. The second lamina is adhered to the first at station 48. Steps 40 through 48 are repeated a plurality of times with each repetition forming a successive lamina that is applied to the stack of laminae at station 48 until a copy of object 10 is formed.

SUMMARY, RAMIFICATIONS AND SCOPE

The present invention is concerned with a method and apparatus for copying the physical form of an object both the internal as well as external structure. The invention uses non-evasive procedures to examine and form a copy of the original object without damaging the original object. The invention has many advantages over previous methods of making copies or models of objects. A few of which are:

It is capable of making copies of objects at various scales of reproduction.

It is useable for making copies of objects out of a variety of materials for use as engineering study models or as actual replacement parts for the object copied.

It is of great value in making copies of living organism's structure such as parts of the human anatomy for either study or engineering analysis. Such a use would be the study of human joints to predict the performance of artificial replacements. The invention can be used to great advantage in the design of biological implants such as prosthetic hips and joints. The process can be used to make replacement parts such as missing bone fragments in a damaged skull.

The invention would be able to track the progress of tumor growth by creating models of the tumor at different stages of development.

Although the foregoing description contains many specificities these should not be construed as limiting the scope of the invention but as merely providing illustrations of some of the presently preferred embodiments of the invention. For example the prior art contains many variations of computed tomography scanners and magnetic resonance imaging apparatuses. Any non-evasive procedure capable of delivering a detailed three-dimensional electronic representation of an object is applicable to this invention. Also, many new three-dimensional printing methods are under development that are capable of rendering three-dimensional electronic sectional data into physical form, any of which would be equally applicable to this invention. The apparatus described in the foregoing text and figures is given only by way of example and the method and apparatus for object replication in accord with this invention is applicable to all Computed Tomography scanners, Magnetic Resonance Imaging apparatuses as well as three-dimensional printers capable of forming a physical object by the use of cross sectional information.

In addition as a Computed Tomography scanner or a Magnetic Resonance Imaging apparatus provides slices of the object to be copied, under certain situations when these slices correspond in thickness to the thickness of the lamina formed by the three-dimensional printer these sectional slices can be provided directly to three-dimensional printer 38. In this case, Image processing station 32, input interface 34, and sectioning station 36 may be omitted.

In addition, the accompanying text and figures describe processes as discrete steps. Discrete hardware corresponding to these steps is not required. For example, most of the steps shown in FIG. 1 steps 14-36 can be accomplished by a single high-speed data processing computer.

Therefore, the scope of the invention should be determined by the appended claims and their legal equivalents, rather than by the examples given.

What is claimed is:

1. An apparatus for forming a three-dimensional reproduction of an object from laminations comprising:
   a. a non-invasive data acquisition means that discerns the exterior and interior structure of said object, said data acquisition means creates electronic sections that represent planar slices of said object;
   b. a three-dimensional printing means whereby said planar slices of said object are manufactured as laminae and joined to create a three-dimensional replica of said object, said three-dimensional printing means comprising:
      (1) means for receiving the electronic sectional data corresponding to an electronic representation of said object;
      (2) means for exposing a charged electro-photographic element with an electro-magnetic radiation pattern corresponding to said electronic sectional data to form a two dimensional electro-static latent image on said electro-photographic element;
      (3) means for applying a plurality of forming powders to said two dimensional electro-static latent image contained on said electro-photographic element to form a physical layer of lamina;
      (4) means for transferring said physical layer of lamina to an intermediate support;
      (5) means for causing said physical layer of lamina to become tacky;
      (6) means for transferring and bonding said physical layer of lamina to previously formed laminae and building up a physical replication of said object in a step-wise fashion whereby the three dimensional object is automatically formed from a composite of laminae.

2. The apparatus as set forth in claim 1 wherein said means for causing said physical layer of lamina to become tacky is induction heating, whereby said plurality of forming powders are deposited in separate adjacent areas to form said physical layer of lamina, the forming powders comprising said separate adjacent areas, each of a different thermal melting point, each comprising a plurality of finely divided metal flakes dispersed therein, said forming powders of a relatively higher thermal melting point containing a proportionately higher percentage of said metal flakes than said forming powders of a relatively lower thermal melting point, whereby the induction heating means by induction heating of said metal flakes induces more rapid heating in said forming powders comprised of said higher percentage of said metal flakes causing all of said forming powders comprising said separate adjacent areas to reach their respective melting points and thus to become tacky substantially at the same time.

3. The apparatus according to claim 1 wherein said non-invasive data acquisition means is a computed tomography scanner comprising:
   a. a source means for generating penetrating radiation such as X-ray or gamma radiation;
   b. a penetrating radiation detection means including a plurality of detector elements forming a plurality of radiation collection points, said detector elements positioned to intercept said penetrating radiation after having passed through the object to be replicated, the radiation detector means generating projection data for each of said detection points corresponding to an intensity of said penetrating radiation beam transmitted through said object and incident on said radiation detector elements for each of said detection points;
   c. a motive means for rotating said source means for generating penetrating radiation, relative to said object to be replicated, said motive means generating a position signal representing a relative rotational position;
   d. a data receiving means, responsive to said position signal from said motive means, for sampling said projection data from said penetrating radiation detecting means;
   e. a reconstruction processing means for reconstructing the projection data acquired by said data receiving means to form a tomographic image of said object.

4. The apparatus according to claim 1 wherein said non-invasive data acquisition means is a magnetic resonance imaging apparatus.

5. An apparatus for forming a three-dimensional reproduction of an object from laminations comprising:
   a. a non-invasive data acquisition means that discerns the exterior and interior structure of said object, said data acquisition means creates an electronic three-dimensional representation of said object;
   b. an electronic sectioning processing means wherein said electronic three-dimensional representation of said object is electronically sectioned into plural parallel planar sections;
   c. a three-dimensional printing means whereby said plural parallel planar sections of said electronic three-dimensional representation of said object are sequentially manufactured as laminae and joined to create a three-dimensional replica of said object, said three-dimensional printing means comprising:
      (1) means for deriving graphic image data output from the data acquisition means, said graphic image data defining successive adjacent cross-sections of the three-dimensional object to be replicated;
      (2) means for exposing a charged electro-photographic element with an electro-magnetic radiation pattern corresponding to said graphic image data, to form a two dimensional electro-static latent image on said electro-photographic element;
      (3) means for applying a plurality of forming powders to said two dimensional electro-static latent image contained on said electro-photographic element to form a physical layer of lamina;
      (4) means for moving said lamina relative to the forming means;
      (5) means for causing said physical layer of lamina to become tacky;
      (6) means for transferring said physical layer of lamina to previously formed laminae;
      (7) means for joining said laminae as they are formed and building up a physical replication of said object in a step-wise fashion whereby the three-dimensional object is automatically formed from a composite of laminae.

6. The apparatus of claim 5 wherein said non-invasive data acquisition means is a computed tomography scanner.

7. The computed tomography scanner of claim 6 comprising:
   a. penetrating radiation source for generating a penetrating radiation fan beam;

b. driving means for rotating said penetrating radiation fan beam relative to an object to be replicated in a plane in which said penetrating radiation fan beam exists, said driving means generating a position signal representing a relative rotational position;

c. stationary penetrating radiation detecting means including a plurality of detector elements which are concentric with a rotational orbit of said penetrating radiation source, a plurality of detection points of said detector elements being arranged at equal angular intervals, said stationary penetrating radiation detecting means generating projection data for each of said detection points corresponding to an intensity of the penetrating radiation, for each of said detection points;

d. data receiving means, responsive to the position signal from said driving means, for sampling said projection data from said penetrating radiation detecting means at co-angular sampling points relative to the rotation of said penetrating radiation beam;

e. reconstruction processing means for reconstructing the projection data acquired by said data acquisition means to form a tomographic image of the object.

8. The computed tomography scanner of claim 7 wherein the penetrating radiation is X-ray radiation.

9. The computed tomography scanner of claim 7 wherein the penetrating radiation is gamma radiation.

10. The apparatus of claim 5 wherein said non-invasive data acquisition means is a magnetic resonance imaging apparatus.

11. The apparatus as set forth in claim 5 wherein said means for causing said physical layer of lamina to become tacky is means for induction heating, whereby said plurality of forming powders are deposited in separate adjacent areas to form said physical layer of lamina, the forming powders comprising said separate adjacent areas, each of a different thermal melting point, each comprising a plurality of finely divided metal flakes dispersed therein, said forming powders of a relatively higher thermal melting point containing a proportionately higher percentage of said metal flakes than said forming powders of a relatively lower thermal melting point, whereby the induction heating means by induction heating of said metal flakes induces more rapid heating in said forming powders comprised of said higher percentage of said metal flakes causing all of said forming powders comprising said separate adjacent areas to reach their respective melting points and thus to become tacky substantially at the same time.

12. An apparatus for forming a three-dimensional reproduction of an object from laminations comprising:

a. a non-invasive data acquisition means that discerns the exterior and interior structure of an object, said data acquisition means creates electronic sections that represent planar slices of said object;

b. a three-dimensional printing means whereby said planar slices of said object are sequentially formed and joined to create a replica of said object, said three-dimensional printing means comprising:

(1) means for deriving graphic image data output from the data acquisition means, said graphic image data defining successive adjacent cross-sections of the three-dimensional object to be replicated;

(2) a sheet of curable polymer.

(3) means for spraying a pattern of catalyst or hardener upon said sheet of curable polymer initiating a curing process, said pattern corresponding to said graphic image data, whereby said sheet of curable polymer is selectively cured to form a physical layer of lamina corresponding to said graphic image data;

(4) means for moving said laminae relative to the forming means;

(5) means for transferring and joining said physical layer of lamina to previously formed laminae as they are formed and building up a physical replication of said object in a step-wise fashion whereby the three-dimensional object is automatically formed from a composite of laminae.

13. The apparatus of claim 12 wherein said non-invasive data acquisition means is a computed tomography scanner.

14. The apparatus of claim 12 wherein said non-invasive data acquisition means is a magnetic resonance imaging apparatus.

* * * * *